US008465055B2

(12) United States Patent
Hill

(10) Patent No.: US 8,465,055 B2
(45) Date of Patent: Jun. 18, 2013

(54) SEATBELT RELIEF DEVICE

(75) Inventor: Gary Hill, Ohsweken (CA)

(73) Assignee: N/A, Ohsweken, Ontario (CA)

( * ) Notice: Subject to any disclaimer, the term of this patent is extended or adjusted under 35 U.S.C. 154(b) by 0 days.

(21) Appl. No.: 13/564,715

(22) Filed: Aug. 1, 2012

(65) Prior Publication Data

US 2013/0033029 A1 Feb. 7, 2013

Related U.S. Application Data

(60) Provisional application No. 61/513,677, filed on Aug. 1, 2011.

(51) Int. Cl.
*B60R 22/00* (2006.01)
(52) U.S. Cl.
USPC ........................................ 280/801.1; 280/808
(58) Field of Classification Search
None
See application file for complete search history.

(56) References Cited

U.S. PATENT DOCUMENTS

| 4,648,625 | A | | 3/1987 | Lynch | |
|---|---|---|---|---|---|
| 4,832,367 | A | | 5/1989 | Linsenby | |
| 4,938,535 | A | * | 7/1990 | Condon et al. | 297/483 |
| 5,058,922 | A | | 10/1991 | Long | |
| 5,135,257 | A | * | 8/1992 | Short | 280/808 |
| 5,211,423 | A | * | 5/1993 | Krambeck | 280/806 |
| 5,340,198 | A | * | 8/1994 | Murphy et al. | 297/483 |
| RE37,942 | E | * | 12/2002 | Glendon | 280/808 |
| 7,513,532 | B1 | * | 4/2009 | Vaughns et al. | 280/808 |
| 7,971,980 | B2 | * | 7/2011 | Jones et al. | 347/88 |

* cited by examiner

*Primary Examiner* — Toan To
(74) *Attorney, Agent, or Firm* — Thien Tran, Esq.; Access Patent Group, LLC

(57) ABSTRACT

A seatbelt relief device for a seatbelt having a shoulder harness utilized by a driver sitting on a seat in a motor vehicle behind a steering wheel. The device comprises a sleeve that fits over a chest portion of the shoulder harness of the seatbelt. A cord assembly extends from the sleeve. A mechanism is for releasably mounting the cord assembly centrally to the steering wheel in a pivotable manner, whereby the sleeve will pull the chest portion of the shoulder harness of the seatbelt slightly away from the chest of the driver to reduce pressure on the chest of the driver.

8 Claims, 5 Drawing Sheets

SEATBELT RELIEF DEVICE

CROSS-REFERENCE TO RELATED APPLICATION

This application claims the benefit of Provisional Patent Application No. 61/513,677, filed on Aug. 1, 2011, In the United States Patent & Trademark Office, the disclosure of which is incorporated herein by reference.

BACKGROUND OF THE INVENTION

1. Field of the Invention

The present invention relates to a motor vehicle safety seatbelt, and more particularly, a seatbelt relief device.

Driving long distances can be taxing on the body, especially when driving while wearing a shoulder harness seatbelt. The seatbelt lies across the driver's chest, which can be uncomfortable. Friction can irritate the chest, while some seatbelts rest high on the body to interfere with movement and handling of the motor vehicle. Some drivers attempt to drive while holding the seatbelt away from their body, which forces them to remove one hand from the steering wheel. A safer option is needed.

The seatbelt relief device is designed to provide a more comfortable way for wearing a shoulder harness seatbelt. The present invention pulls the seatbelt slightly away from the chest area to ensure comfort and eliminate irritation. It allows the shoulder harness seatbelt to function as intended without compromising safety. The seatbelt relief device is ideal for use by people who drive long distances, such as truck drivers or vacationers. Consumers will appreciate the comfort and efficiency that the present invention affords.

2. Description of the Prior Art

Numerous innovations for seatbelt restraining apparatuses have been provided in the prior art that will be described. Even though these innovations may be suitable for the specific individual purposes to which they address, however, they differ from the present invention.

A first example, U.S. Pat. No. 4,648,625, Issued on Mar. 10, 1987, to Lynch teaches a seatbelt tension relief device that is formed with an elastic self-retracting member which at one end is pivotally mounted adjacent the door frame while at the other end adjustably engages the torso engaging portion of the seatbelt. The length of the elastic self-retracting member, as well as the strap engaging end portion, are readily adjustable to the comfort of the user. When not in use the device is adjustably mounted parallel to and along the door frame. The device is designed to be economically retrofitted in automobiles with spring-loaded seatbelts.

A second example, U.S. Pat. No. 4,832,367, Issued on May 23, 1989, to Lisenby teaches a belt restraining apparatus which includes a shoulder belt portion and a lap belt portion. The shoulder belt is positioned over one shoulder and across the chest of the passenger, and the lap belt is positioned across the lap of the passenger. An auxiliary strap extends vertically between and interconnects the lap belt and a medial portion of the shoulder belt. The strap is of a length to deflect the shoulder belt downwardly and away from the neck of the passenger to assure passenger comfort.

A third example, U.S. Pat. No. 5,058,922, Issued on Oct. 22, 1991, to Long teaches a device for improving comfort of a person seated in a motor vehicle using a safety belt assembly provided therein that includes a shoulder strap. Such device includes as essential parts (a) a suction cup that may be releasably adhered to the windshield, side window or other part of said motor vehicle, (b) a clip that may be releasably attached to a part of the shoulder strap, (c) a cord attached to one end to the suction cup and slidably looped through the clip creating a first section or cord that extends from the suction cup to the clip and a second section of cord that leads away from the clip but does not connect with the suction cup and (d) a cord jam member for manually adjusting the length of the first section of the cord.

A fourth example, U.S. Pat. No. 5,135,257, Issued on Aug. 4, 1992, to Short teaches an adjustable breakaway comfort strap for use in connection with a restraining system which includes a seatbelt and shoulder harness combination. The device includes first and second elongated strap members, each strap member having a combination of fastening elements such as VELCRO attached thereto for allowing adjustable attachment of the first and second strap members to the shoulder harness and lap belt strap respectively of an automobile restraining system. The first and second elongated straps also include an attachment tab which allows interconnection of the two straps to form a single elongated strap. The attachment tab is sized so that the attachment strength rendered thereby can be countered by forces generated in the shoulder harness of the restraining system in such a manner that an emergency situation will cause the shoulder harness and/or lap belt to pull the first and second strap apart at the tab and allow the restraining system to function properly, as originally designed, without interference from the comfort strap.

A fifth example, U.S. Pat. No. 7,513,532, Issued on Apr. 7, 2009, to Vaughns Sr. teaches a device to adjust tension in a shoulder belt of a vehicle. The device may include a front cover and a back cover placed within the front cover to form a cover opening. A spring may be secured to an interior of the back cover by the spring anchor, where the spring may be a coiled internal power spring. The device may have a band having a first band end and a second band end, where the first band end may contain hook fasteners and the second band end may contain loop fasteners such that, when brought together, the hook fasteners and loop fasteners may be secured to each other to form a band loop. The device may have a cord connected between to the first band end and the spring and configured to extend through the cover opening.

It is apparent now that numerous innovations for seatbelt restraining apparatuses have been provided in the prior art that are adequate for various purposes. Furthermore, even though these innovations may be suitable for the specific individual purposes to which they address, accordingly, they would not be suitable for the purposes of the present invention as heretofore described.

SUMMARY OF THE INVENTION

An object of the present invention is to provide a seatbelt relief device that avoids the disadvantages of the prior art.

Another object of the present invention is to provide a seatbelt relief device that is simple and inexpensive to manufacture.

Still another object of the present invention is to provide a seatbelt relief device that is simple to use.

Briefly stated, still yet another object of the present invention is to provide a seatbelt relief device for a seatbelt having a shoulder harness utilized by a driver sitting on a seat in a motor vehicle behind a steering wheel. The device comprises a sleeve that fits over a chest portion of the shoulder harness of the seatbelt. A cord assembly extends from the sleeve. A mechanism is for releasably mounting the cord assembly centrally to the steering wheel in a pivotable manner, whereby the sleeve will pull the chest portion of the shoulder harness of the seatbelt slightly away from the chest of the driver to reduce pressure on the chest of the driver.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

REFERENCE NUMERALS UTILIZED IN THE DRAWING

Figure 1:
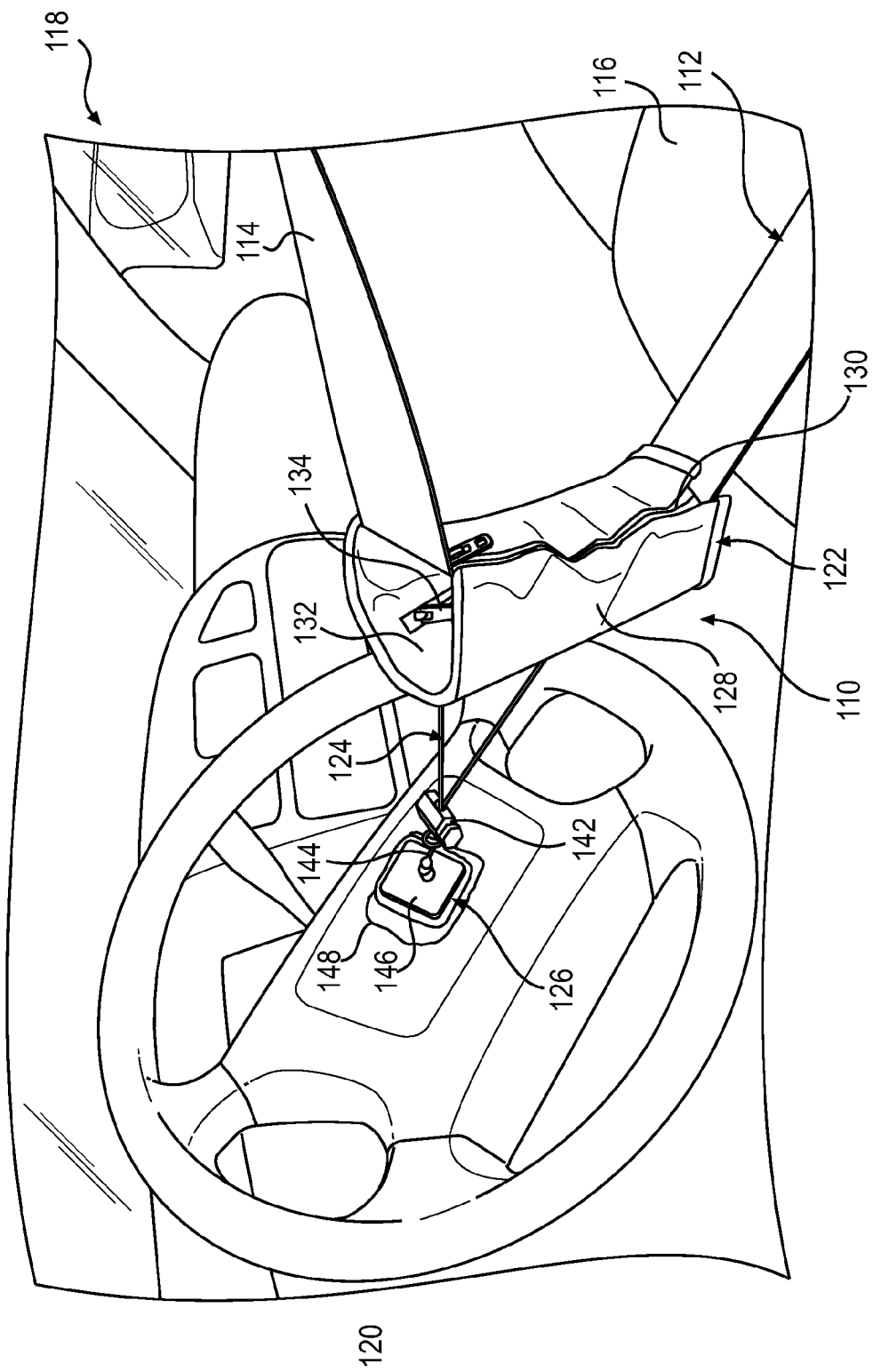
FIG. 1 is a rear perspective view of the present invention in use.

110 seatbelt relief device
112 seatbelt
114 shoulder harness of seatbelt 12
116 seat of motor vehicle 118
118 motor vehicle
120 steering wheel of motor vehicle 118
122 sleeve of device 110
124 cord assembly of device 110
126 releasably mounting mechanism of device 110
128 rectangular piece of flexible material of sleeve 122
130 first ZIPPER of sleeve 122
132 elongated pocket of sleeve 122
134 second ZIPPER of sleeve 122
136 eyelet of sleeve 122
138 elongated cord of cord assembly 124
140 first block member of cord assembly 124
142 second block member of cord assembly 124
144 pivot joint component of mechanism 126
146 first VELCRO fastener member of mechanism 126
148 second VELCRO fastener member of mechanism 126
150 third VELCRO fastener member of mechanism 126

DETAILED DESCRIPTION OF THE PREFERRED EMBODIMENT

Figure 2:
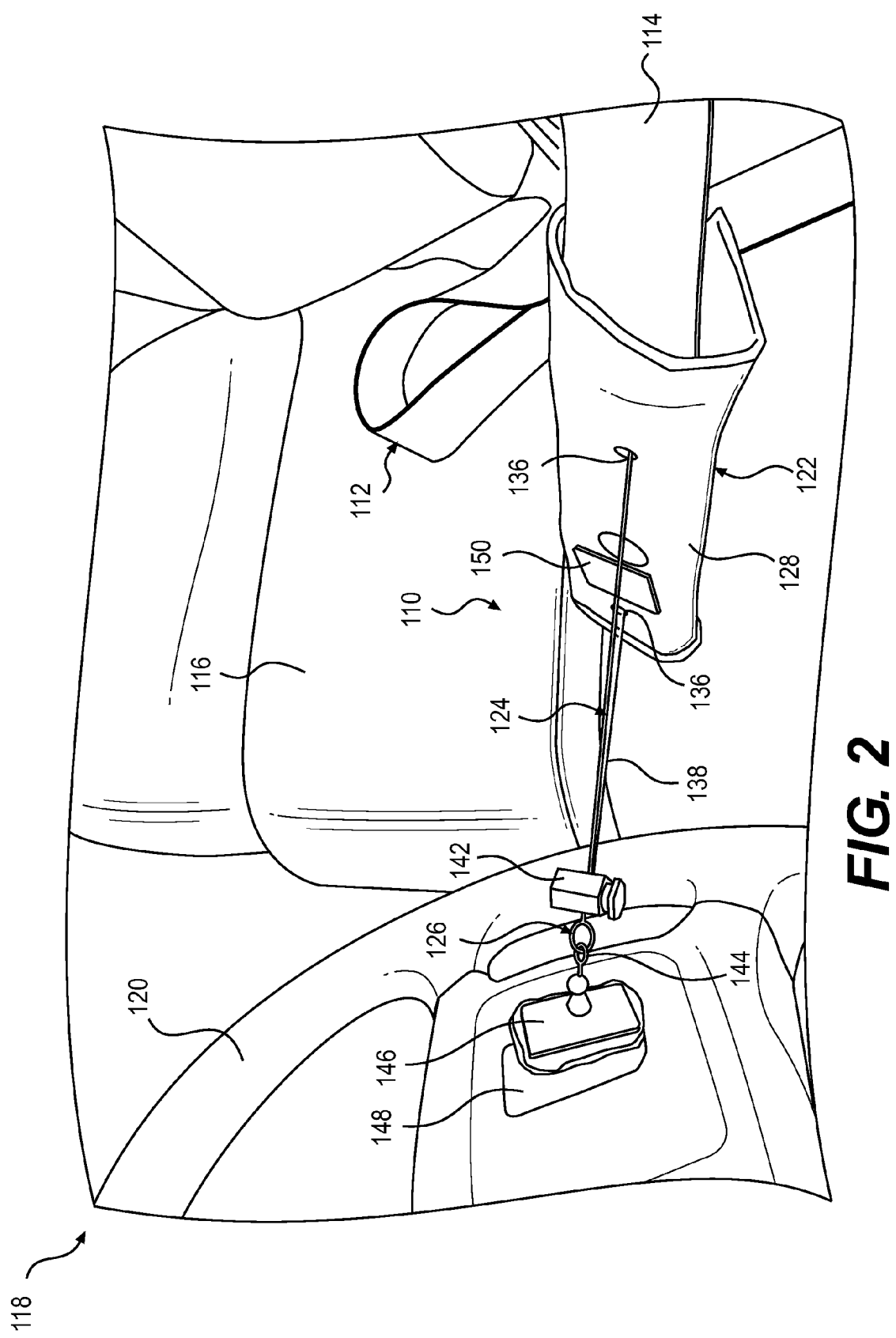
FIG. 2 is a front perspective view of the present invention in use.
Figure 3:
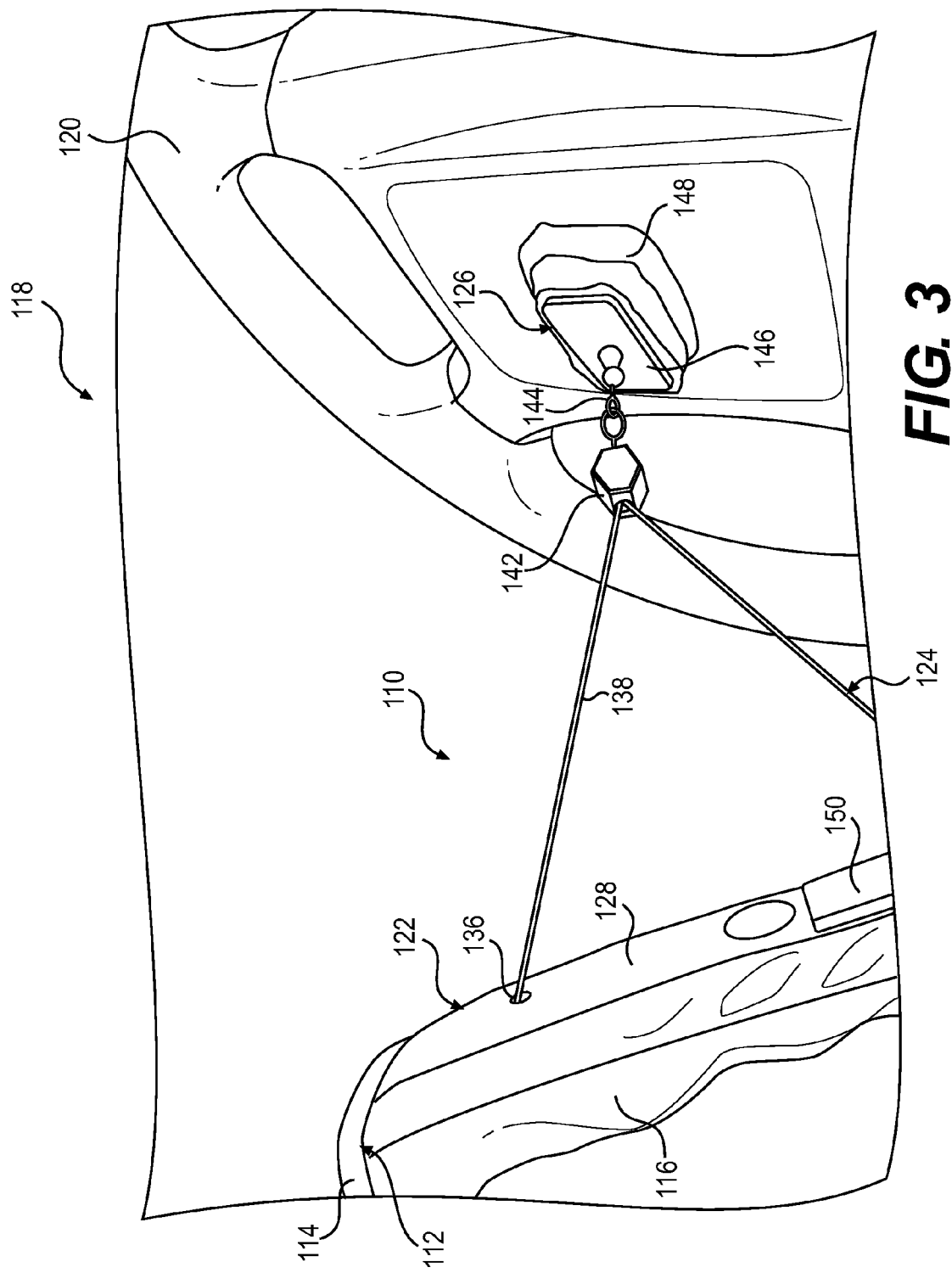
FIG. 3 is a side perspective view of the present invention in use.

As shown in FIGS. 1, 2 and 3 the present invention is a seatbelt relief device 110 for a seatbelt 112 having a shoulder harness 114 utilized by a driver (not shown) sitting on a seat 116 in a motor vehicle 118 behind a steering wheel 120. The device 110 comprises a sleeve 122 that fits over a chest portion of the shoulder harness 114 of the seatbelt 112. A cord assembly 124 extends from the sleeve 122. A mechanism 126 is for releasably mounting the cord assembly 124 centrally to the steering wheel 120 in a pivotable manner, whereby the sleeve 122 will pull the chest portion of the shoulder harness 114 of the seatbelt 112 slightly away from the chest of the driver to reduce pressure on the chest of the driver.

Figure 4:
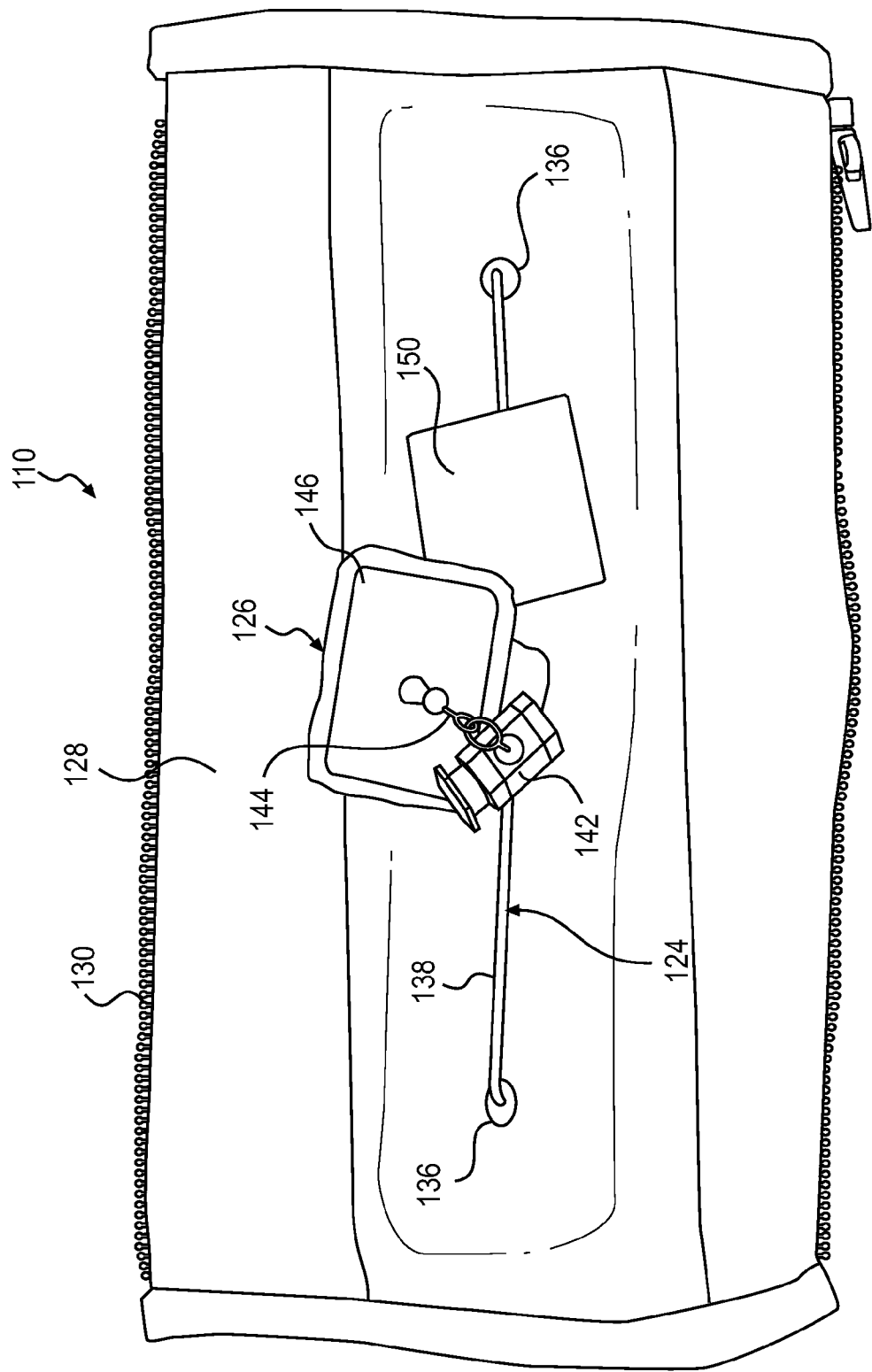
FIG. 4 is a front elevational view of the present invention in an open flat storage position.
Figure 5:
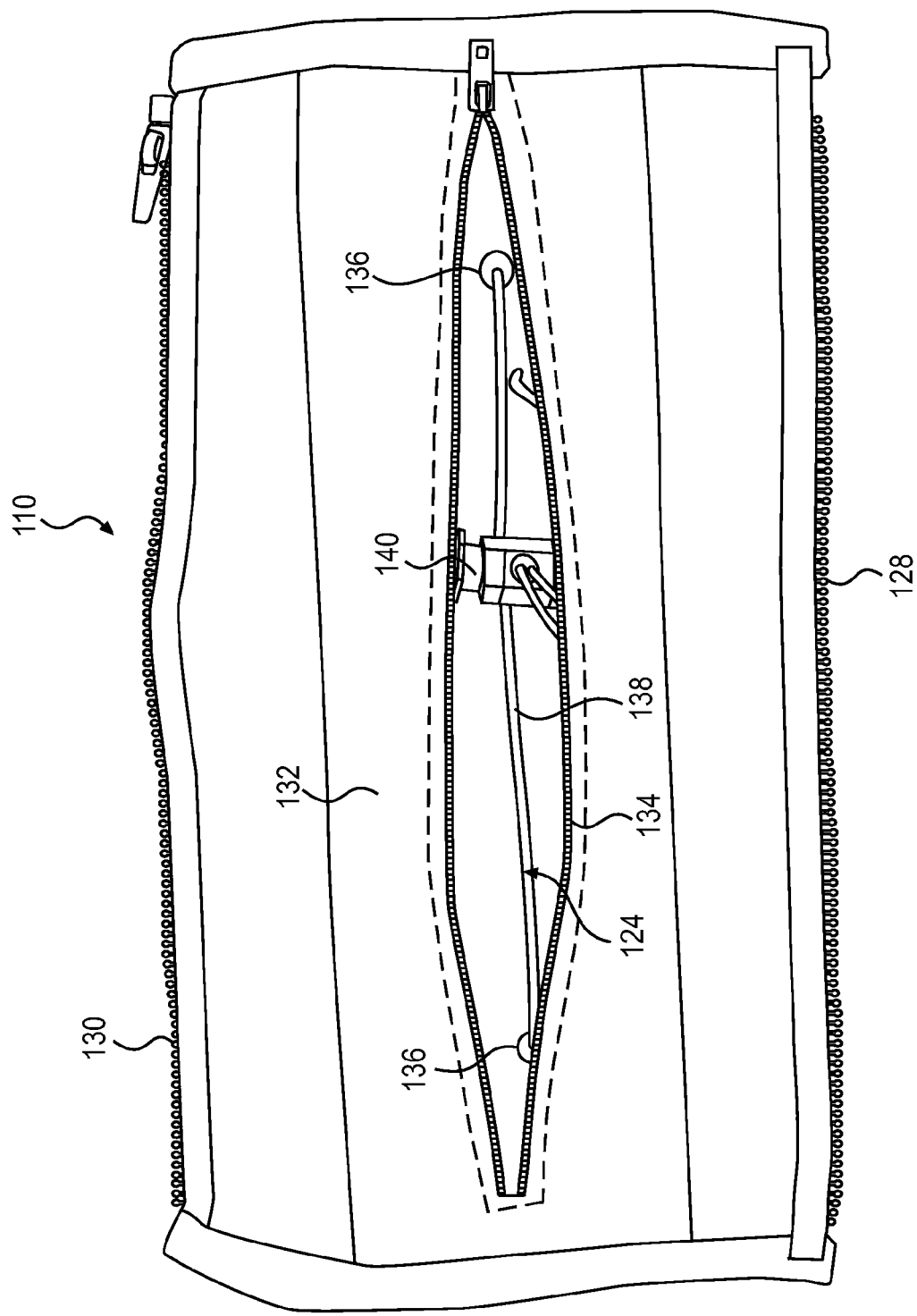
FIG. 5 is a rear elevational view of the present invention in an open flat storage position.

As shown in FIGS. 4 and 5, the sleeve 122 is comprised of a rectangular piece of flexible material 128. A first ZIPPER 130 has two interlocking sides, with each located along one long edge of the rectangular piece of flexible material 128 to secure the rectangular piece of flexible material 128 about the chest portion of the shoulder harness 114 of the seatbelt 112. An elongated pocket 132 is centrally affixed onto an inner surface of the rectangular piece of flexible material 128. A second ZIPPER 134 is affixed onto the elongated pocket 132 to open and close the elongated pocket 132. A pair of eyelets 136 are longitudinally spaced apart and centrally located through the rectangular piece of flexible material 128 at the elongated pocket 132.

The cord assembly 124 consists of an elongated cord 138 that extends through the pair of eyelets 136 and is formed in a V-shaped configuration. A first block member 140 having a central aperture therethrough, is located within the elongated pocket 132 on the rectangular piece of flexible material 128. Ends of the elongated cord 138 extending through the eyelets 136 will go through the central aperture in the first block member 140 and then be tied together, so that the length of the elongated cord 138 can be adjusted. A second block member 142 has the apex of the elongated cord 138 connected thereto externally from the rectangular piece of flexible material 128.

The releasably mounting mechanism 126 contains a pivot joint component 144 extending from the second block member 142. A first VELCRO fastener member 146 is connected centrally to the pivot joint component 144. A second VELCRO fastener member 148 is connected centrally to the steering wheel 120 of the motor vehicle 118 to retain the first VELCRO fastener member 146 thereto. A third VELCRO fastener member 150 is connected to an outer surface of the rectangular piece of flexible material 128 to retain the first VELCRO fastener member 146 thereto when not in use.

The rectangular piece of flexible material 128 and the elongated pocket 132 are both comprised out of vinyl or cloth. The rectangular piece of flexible material 128 measures approximately ten inches by three inches by one half inch. The elongated cord 138 is fabricated out of elastic material.

It will be understood that each of the elements described above, or two or more together, may also find a useful application in other types of constructions differing from the types described above.

While the invention has been illustrated and described as embodiments of a seatbelt relief device, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A seatbelt relief device for a seatbelt having a shoulder harness utilized by a driver sitting on a seat in a motor vehicle behind a steering wheel, the device comprising:
    a) a sleeve that fits over a chest portion of the shoulder harness of the seatbelt;
    b) a cord assembly extending from the sleeve; and
    c) means for releasably mounting the cord assembly centrally to the steering wheel in a pivotable manner, whereby the sleeve will pull the chest portion of the shoulder harness of the seatbelt slightly away from the chest of the driver to reduce pressure on the chest of the driver.

2. The device as recited in claim 1, wherein the sleeve comprises:
   a) a rectangular piece of flexible material;
   b) a first ZIPPER having two interlocking sides, each located along one long edge of the rectangular piece of flexible material to secure the rectangular piece of flexible material about the chest portion of the shoulder harness of the seatbelt;
   c) an elongated pocket centrally affixed onto an inner surface of the rectangular piece of flexible material;
   d) a second ZIPPER affixed onto the elongated pocket to open and close the elongated pocket; and
   e) a pair of eyelets longitudinally spaced apart and centrally located through the rectangular piece of flexible material at the elongated pocket.

3. The device as recited in claim 2, wherein the cord assembly comprises:
   a) an elongated cord that extends through the pair of eyelets and formed in a V-shaped configuration;
   b) a first block member having a central aperture therethrough, located within the elongated pocket on the rectangular piece of flexible material, whereby ends of the elongated cord extending through the eyelets will go through the central aperture in the first block member and then be tied together, so that the length of the elongated cord can be adjusted; and
   c) a second block member having the apex of the elongated cord connected thereto externally from the rectangular piece of flexible material.

4. The device as recited in claim 3, wherein the releasably mounting means comprises:
   a) a pivot joint component extending from the second block member;
   b) a first VELCRO fastener member connected centrally to the pivot joint component;
   c) a second VELCRO fastener member connected centrally to the steering wheel of the motor vehicle to retain the first VELCRO fastener member thereto; and
   d) a third VELCRO fastener member connected to an outer surface of the rectangular piece of flexible material to retain the first VELCRO fastener member thereto when not in use.

5. The device as recited in claim 2, wherein the rectangular piece of flexible material and the elongated pocket are both comprised out of vinyl.

6. The device as recited in claim 2, wherein the rectangular piece of flexible material and the elongated pocket are both comprised out of cloth.

7. The device as recited in claim 2, wherein the rectangular piece of flexible material measures approximately ten inches by three inches by one half inch.

8. The device as recited in claim 3, wherein the elongated cord is fabricated out of elastic material.

* * * * *